Patented Jan. 2, 1945

2,366,612

UNITED STATES PATENT OFFICE 2,366,612

IMPREGNATING SOLUTIONS

Bror Olof Häger, Stockholm, Sweden, assignor to Bolidens Gruvaktiebolag, Stockholm, Sweden, a limited stock company of Sweden No Drawing. Application July 28, 1942, Serial No. 452,631

4 Claims. (Cl. 167—38.5)

The present invention relates to improvements in impregnating solutions for wood or other organic materials, more particularly to impregnating solutions of the kind described in my U. S. Patent No. 2,139,747, in which solutions chemical changes causing a precipitation of difficultly soluble substances occur after the introduction of the solutions into the material to be impregnated.

In order to give the idea of my invention a short description will be given of the principle on which my said U. S. patent is based.

If a solution of arsenic acid and any hexavalent chromium compound such as chromic acid $(2H_3AsO_4+2CrO_3)$ is introduced into wood a chemical reaction will take place whereby certain substances in the wood reduce the chromic acid to trivalent chromium ions. With the arsenate ions these chromium ions will form chromium arsenate, which is difficultly soluble and is therefore precipitated in the wood. Concurrently, the acidity of the solution will diminish.

If any difficultly soluble arsenate (e. g. zinc arsenate) is dissolved in a solution of arsenic and chromic acids and the solution is introduced into wood the zinc arsenate will be precipitated in the wood as a result of the acidity of the solution being reduced as the precipitation of the chromium arsenate proceeds.

In a solution of arsenic acid and chromic acid of the said composition $(2H_3AsO_4+2CrO_3)$, containing about 0.4 per cent of $As_2O_5$, 3 mols of zinc arsenate can be dissolved to every 2 mols of arsenic acid+2 mols of chromic acid. The resulting solution will contain about 1 per cent of $As_2O_5$, which is the usual concentration for impregnating work. The solution will then contain the following substances:

(1)  $3ZnHAsO_4+2H_3AsO_4+2CrO_3$

When this solution is introduced into the wood zinc arsenate and chromium arsenate will be precipitated, principally according to the following formula:

(2)  $3ZnHAsO_4+2CrSsO_4+3H_2O+3O$

In my U. S. patent referred to above an impregnating solution of the following composition is described:

(3)  $Na_2Cr_2O_7+ZnCl_2+2ZnO+5H_3AsO_4$

When introduced into the wood this solution will principally produce the following substances:

(4)  $3ZnHAsO_4+2CrAsO_4+6H_2O+3O+2NaCl$

The impregnating Solution 3 differs from Solution 1 primarily in that it produces sodium chloride in the wood undergoing treatment.

My U. S. Patent No. 2,139,747 also states that the use of easily soluble substances in the preparation of the impregnating solution is preferable to the use of compounds that are difficultly soluble. The patent specification gives an instance of this, namely a solution containing the following substances in the following proportions:

(5)  $Na_2Cr_2O_7+2Na_2HAsO_4+3H_3AsO_4+3ZnSO_4$

The conversion of this solution in the wood will principally produce the following substances:

(6)  $3ZnHAsO_4+2CrAsO_4+4H_2O+3O+3Na_2SO_4$

The impregnating Solution 5 differs from Solution 1 primarily in that it produces sodium sulphate in the wood undergoing treatment.

A solution as in (5) above will generally give very satisfactory results. In practice however it has often been found preferable to use more bichromate than prescribed above for the reason that bichromate is the key substance of the reaction and an excess of bichromate will consequently result in a more complete precipitation of the effective substances. The following examples illustrate this.

Pieces of wood (1.5 by 2 by 5 cm.) were impregnated with a solution prepared according to Formula 5 and similar pieces with a solution of the same composition but with a surplus of ten per cent of $Na_2Cr_2O_7$. The pieces were then subjected to leaching in running water and the amount of $As_2O_5$ was determined. The following results were obtained:

Amounts of $As_2O_5$ remaining after leaching, in per cent of original contents

| Days of leaching | Ordinary solution | Solution with an excess of 10 per cent of bichromate |
|---|---|---|
| 2 | 79.7 / 79.3 | 88.4 / 88.6 |
| 15 | 67.0 / 66.0 | 75.9 / 74.5 |
| 30 | 64.3 / 65.7 | 71.7 / 71.9 |
| 60 | 63.3 / 62.1 | 68.6 / 68.8 |
| 120 | 57.7 / 58.3 | 64.4 / 64.2 |

If the wood does not absorb the impregnating fluid easily an excess of bichromate is particularly important in order to make sure of the best possible precipitation of the preservative substances in the inner layers of the wood.

According to the present invention, more than 2 but less than 2.6 mols of $CrO_3$ should therefore preferably be used to every 2 mols of $H_3AsO_4$ in order to obtain satisfactory results.

If heat is applied to speed up the impregnating operation it has been found preferable to use a solution containing less zinc arsenate, in order to avoid part of the zinc arsenate being precipitated when the heat is applied, the zinc arsenate being less soluble in hot than in cold solutions. That will be shown by the following experiment.

Solutions containing zinc arsenate and bichromate in different proportions have been heated and the temperature noted at which precipitation occurs in each case. The same experiments have been repeated with 1 g. of sugar dissolved in 250 cc. of the solution. This will make the solution less resistant to the action of the reducing substances that may be dissolved from the wood, as the sugar will eventually reduce the bichromate. In practice the solutions generally contain reducing agents leached from the wood. The experiments with the sugary solutions illustrate what is happening when such reducing agents are present in the impregnating solutions. The following results were obtained:

| Solution | Result |
|---|---|
| Solution containing $Na_2Cr_2O_7 + 2Na_2HAsO_4 + 3H_3AsO_4 + 3ZnSO_4$ see (5) compared with (2) | White precipitation at 67° C. |
| The same solution with sugar | White precipitation at 64° C. |
| Solution containing $Na_2Cr_2O_7 + Na_2HAsO_4 + 3H_3AsO_4 + 2ZnSO_4$ (The composition corresponding to $2ZnHAsO_4 + 2H_3AsO_4 + 2CrO_3$) | No precipitation after boiling 2 hours |
| The same solution with sugar | White precipitation after boiling 14 min. |
| The solution contains $Na_2Cr_2O_7 + 3H_3AsO_4 + ZnSO_4$ (The composition corresponding to $ZnHAsO_4 + 2H_3AsO_4 + 2CrO_3$) | Green precipitation after boiling 27 min. No precipitation after boiling 2 hours |
| The same solution with sugar | White and green precipitation after boiling 27 min. |

Copper salts may also be used in equivalent quantities instead of zinc salts. The following experiments in heating copper solutions have been made.

| Solution | Result |
|---|---|
| Solution containing $Na_2Cr_2O_7 + 2Na_2HAsO_4 + 3H_3AsO_4 + 3CuSO_4$ (The composition corresponding to $3CuHAsO_4 + 2H_3AsO_4 + 2CrO_3$) | Precipitation at 59° C. |
| The same solution with sugar | Precipitation at 56° C. |
| Solution containing $Na_2Cr_2O_7 + Na_2HAsO_4 + 3H_3AsO_4 + 2CuSO_4$ (The composition corresponding to $2CuHAsO_4 + 2H_3AsO_4 + 2CrO_3$) | Precipitation at 96° C. |
| The same solution with sugar | Precipitation at 94° C. |
| Solution containing $Na_2Cr_2O_7 + 3H_3AsO_4 + CuSO_4$ (The composition corresponding to $CuHAsO_4 + 2H_3AsO_4 + 2CrO_3$) | After boiling 12 min. slight precipitation occurred, which was not increased by 2 hours boiling |
| The same solution with sugar | After boiling 8 min. a slight precipitation occurred. After boiling 17 min. heavy precipitation occurred. |

Aluminium salts may also be substituted for zinc salts in which case between 1 to 2 mols of aluminium arsenate ($AlAsO_4$) should replace the zinc arsenate.

The following heating experiments have been made with such solutions.

| Solution | Result |
|---|---|
| Solution containing $Na_2Cr_2O_7 + 2Na_2HAsO_4 + 2H_3AsO_4 + Al_2(SO_4)_3$ (The composition corresponding to $2AlAsO_4 + 2H_3AsO_4 + 2CrO_3$) | White precipitation at 70° C. |
| The same solution with sugar | White precipitation at 70° C. |
| Solution containing $Na_2Cr_2O_7 + \frac{1}{2}Na_2HAsO_4 + 2\frac{1}{2}H_3AsO_4 + \frac{1}{2}Al_2(SO_4)_3$ (The composition corresponding to $(AlAsO_4 + 2H_3AsO_4 + 2CrO_3)$) | White precipitation at 78° C. |
| The same solution with sugar | White precipitation at 77° C. |

Instead of dizinc-, dicopper-, or trialuminium arsenate other arsenates of these metals can be used in solutions described above.

Other difficulty soluble arsenates may be used for the same purpose, e. g. the arsenates of calcium, magnesium, barium, cadmium or the like.

In practice the solutions are best prepared from easily soluble substances as described in my U. S. Patent No. 2,139,747. The solution described above may for instance be prepared from alkali bichromate, arsenic acid, alkali arsenate and zinc sulphate (copper sulphate, aluminium sulphate) or other soluble compounds. Examples of solutions of such composition are the solutions used in the experiments described above to investigate the resistance to heating.

Having thus described my invention I declare that what I claim is:

1. An aqueous solution for impregnating wood or other organic materials, said solution containing more than one mol of a difficultly soluble arsenate and between 2.0 and 2.6 mols of $CrO_3$ to each 2 mols of $H_3AsO_4$, the amount of said difficultly soluble arsenate being less than that required for saturating the acid solution at ordinary temperatures.

2. An aqueous solution for impregnating wood or other organic materials, as claimed in claim 1, containing between 1 and 3 mols of $ZnHAsO_4$ and between 2 and 2.6 mols of $CrO_3$ to every 2 mols of $H_3AsO_4$.

3. An aqueous solution for impregnating wood or other organic materials as claimed in claim 1, containing between 1 and 3 mols of $CuHAsO_4$ and between 2 and 2.6 mols of $CrO_3$ to every 2 mols of $H_3AsO_4$.

4. An aqueous solution for impregnating wood or other organic materials as claimed in claim 1, containing between 1 and 2 mols of $AlAsO_4$ and between 2 and 2.6 mols of $CrO_3$ to every 2 mols of $H_3AsO_4$.

BROR OLOF HÄGER.

CERTIFICATE OF CORRECTION.

Patent No. 2,366,612. January 2, 1945.

BROR OLOF HÄGER.

It is hereby certified that error appears in the printed specification of the above numbered patent requiring correction as follows: Page 1, first column, line 47, for that portion of the formula reading "$2CrSsO_4$" read --$2CrAsO_4$--; page 2, first column, lines 29, 49 and 53 and second column, line 9, after "$2CrO_3$" insert a closing parenthesis; same page, first column, line 33, for "$ZnSoe_4$" read --$ZnSO_4$--; and that the said Letters Patent should be read with this correction therein that the same may conform to the record of the case in the Patent Office.

Signed and sealed this 15th day of May, A. D. 1945.

Leslie Frazer (Seal)

Acting Commissioner of Patents.